United States Patent
Turbak et al.

(10) Patent No.: US 10,344,659 B2
(45) Date of Patent: Jul. 9, 2019

(54) AUXILIARY DIESEL EXHAUST FLUID SYSTEMS

(71) Applicant: Cummins Power Generation IP, Inc., Minneapolis, MN (US)

(72) Inventors: Michael J. Turbak, Saint Paul, MN (US); Madhukar R. Mahishi, Roseville, MN (US); Neeraj M. Bapat, New Brighton, MN (US); Pushkar U. Vaidya, Blaine, MN (US); Brandon Kallies, Golden Valley, MN (US); Warren R. Peltier, Lino Lakes, MN (US); Ndaga S. Mwakabuta, Blaine, MN (US); Shalini Volety, New Brighton, MN (US); James Wygralak, Coon Rapids, MN (US)

(73) Assignee: Cummins Power Generation IP, Inc., Minneapolis, MN (US)

( * ) Notice: Subject to any disclaimer, the term of this patent is extended or adjusted under 35 U.S.C. 154(b) by 992 days.

(21) Appl. No.: 14/560,160

(22) Filed: Dec. 4, 2014

(65) Prior Publication Data

US 2016/0160731 A1    Jun. 9, 2016

(51) Int. Cl.
*F01N 13/00*    (2010.01)
*F01N 3/20*    (2006.01)
*F01N 9/00*    (2006.01)

(52) U.S. Cl.
CPC ......... *F01N 13/002* (2013.01); *F01N 3/2066* (2013.01); *F01N 9/00* (2013.01);
(Continued)

(58) Field of Classification Search
CPC ............... F01N 13/002; F01N 2610/14; F01N 2610/1406; F01N 2610/142;
(Continued)

(56) References Cited

U.S. PATENT DOCUMENTS

| 6,216,755 B1 | 4/2001 | Neufert |
| 6,374,868 B1 | 4/2002 | Channing |

(Continued)

FOREIGN PATENT DOCUMENTS

| DE | 1020080 60 937 | 6/2010 |
| EP | 2 400 125 | 12/2011 |

(Continued)

*Primary Examiner* — Phutthiwat Wongwian
*Assistant Examiner* — Diem T Tran
(74) *Attorney, Agent, or Firm* — Foley & Lardner LLP (57) ABSTRACT

Generator assembly systems and methods of manufacturing and operating generator assembly systems. The generator assembly system includes a generator enclosure, a diesel engine, an aftertreatment exhaust system, a primary diesel exhaust fluid system, and an auxiliary diesel exhaust fluid system. The primary diesel exhaust fluid system includes a primary diesel exhaust fluid storage tank fluidly coupled to the aftertreatment exhaust system. The auxiliary diesel exhaust fluid system includes an auxiliary diesel exhaust fluid storage tank and a transfer pump fluidly coupled to the auxiliary diesel exhaust fluid storage tank. The auxiliary diesel exhaust fluid system is housed in an auxiliary enclosure positioned outside of the generator enclosure. At least one fluid conduit fluidly couples the transfer pump to the primary diesel exhaust fluid storage tank.

22 Claims, 6 Drawing Sheets

(52) U.S. Cl.
CPC ...... *F01N 2590/10* (2013.01); *F01N 2610/14* (2013.01); *F01N 2610/142* (2013.01); *F01N 2610/144* (2013.01); *F01N 2610/1406* (2013.01); *F01N 2900/1808* (2013.01); *F01N 2900/1811* (2013.01); *F01N 2900/1814* (2013.01); *Y02T 10/24* (2013.01); *Y02T 10/47* (2013.01)

(58) Field of Classification Search
CPC ........... F01N 2610/144; F01N 2590/10; F01N 2900/1808; F01N 2900/1811; F01N 2900/1814; F01N 3/2066; F01N 9/00; Y02T 10/24; Y02T 10/47
USPC .......................................... 60/285, 298, 299
See application file for complete search history.

(56) References Cited

U.S. PATENT DOCUMENTS

| | | | |
|---|---|---|---|
| 6,756,693 B2* | 6/2004 | Kennedy | B60R 16/04 |
| | | | 290/1 A |
| 6,901,748 B2 | 6/2005 | Gomulka | |
| 7,866,512 B2 | 1/2011 | Fertig | |
| 7,912,360 B2 | 3/2011 | Gschwind | |
| 8,403,002 B2 | 3/2013 | Dettinger et al. | |
| 8,528,322 B2 | 9/2013 | Van Vuuren | |
| 8,539,997 B2 | 9/2013 | Driftmeyer et al. | |
| 8,680,437 B2 | 3/2014 | Starck | |
| 2001/0029733 A1* | 10/2001 | Suzuki | F02B 63/04 |
| | | | 60/796 |
| 2009/0229674 A1 | 9/2009 | Revink | |
| 2010/0200107 A1 | 8/2010 | Weathers et al. | |
| 2010/0224284 A1 | 9/2010 | Kolberg et al. | |
| 2011/0094594 A1 | 4/2011 | Baumeister | |
| 2011/0247593 A1* | 10/2011 | Yoshizaki | F02M 31/18 |
| | | | 123/520 |
| 2013/0025265 A1 | 1/2013 | Gundrum | |
| 2013/0192714 A1 | 8/2013 | Wagner | |
| 2013/0239845 A1* | 9/2013 | Frazier | B61C 3/00 |
| | | | 105/27 |
| 2013/0306665 A1 | 11/2013 | Eberhardt et al. | |

FOREIGN PATENT DOCUMENTS

| | | |
|---|---|---|
| JP | 2003341797 | * 12/2003 |
| WO | WO-2012/072907 | 6/2012 |
| WO | WO-2012/107315 | 8/2012 |

* cited by examiner

AUXILIARY DIESEL EXHAUST FLUID SYSTEMS

TECHNICAL FIELD

The present disclosure relates to diesel exhaust fluid (DEF) systems.

BACKGROUND

Diesel engine power systems may be used to provide mechanical power in multiple applications, many of them stationary or semi-stationary, such as for oil and gas mining, construction applications, as electrical power generators, pumps, compressors, HVAC systems, for powering forestry equipment and other operations. Electrical power generators ("gensets") can be configured to provide standby power in case of power failure or provide continuous or "prime" power generation. Gensets placed at customer sites can also be configured to provide HVAC services in combined heat and power (CHP) or both heat and cooling in trigeneration configuration. In many cases diesel engine power systems, and in particular, diesel electric power-generator systems can be run uninterrupted for extended periods of time, such as 7 to 10 days or longer. Diesel power-generation systems may include rental generators or "gensets" that are powered by diesel engines and may carry an on-board diesel exhaust fluid (DEF) tank or other emissions reductant material storage tank for treating the exhaust produced by the diesel engine. On-board or local DEF tanks for mobile/rental genset or stationary gensets can generally have level, quality and temperature sensors, which control modules continuously, monitor and run pre-programmed control logic for optimized use of the DEF based on the output of the sensors. If, for example, these sensors find parameters outside of normal range, the generator can be required to shut down, thereby stalling operations for extended periods of time.

Running such generators for extending periods of time uninterrupted generally requires an auxiliary fuel supply or fuel feed, such as a 1000 gallon auxiliary diesel fuel tank. However, the DEF tank on-board the genset generally lacks the capacity to permit the engine to run uninterrupted based on the quantity of fuel supplied by the auxiliary fuel supply due to the physical size and footprint limitations of the generator.

SUMMARY

Various embodiments provide generator assembly systems and methods of manufacturing and operating generator assembly systems.

In particular embodiments, a generator assembly system is provided that includes a generator enclosure. A diesel engine is housed, at least in part, in the generator enclosure. An aftertreatment exhaust system is coupled to an exhaust manifold of the diesel engine. The aftertreatment exhaust system is housed, at least in part, in the generator enclosure. A primary diesel exhaust fluid system including a primary diesel exhaust fluid storage tank is fluidly coupled to the aftertreatment exhaust system. The primary diesel exhaust fluid system is housed, at least in part, in the generator enclosure. An auxiliary diesel exhaust fluid system includes an auxiliary diesel exhaust fluid storage tank. The auxiliary diesel exhaust fluid system is housed in an auxiliary enclosure positioned outside of the generator enclosure. At least one controller is communicably coupled to the primary diesel exhaust fluid system. The at least one controller is configured to cause transfer of diesel exhaust fluid from the auxiliary diesel exhaust fluid storage tank to the primary diesel exhaust fluid storage tank.

In particular embodiments, a transfer pump is fluidly coupled to the auxiliary diesel exhaust fluid storage tank, and at least one fluid conduit fluidly couples the transfer pump to the primary diesel exhaust fluid storage tank. The at least one controller may be further communicably connected to the transfer pump, and the at least one controller may be configured to activate the transfer pump, thereby causing the transfer of diesel exhaust fluid from the auxiliary diesel exhaust fluid storage tank to the primary diesel exhaust fluid storage tank. The primary diesel exhaust fluid system may include a level sensor configured to sense a quantity of fluid in the primary diesel exhaust fluid storage tank. The level sensor is communicably coupled to the at least one controller. The at least one controller is configured to activate the transfer pump based, at least in part, on the sensed quantity of fluid. The primary diesel exhaust fluid system includes a temperature sensor configured to sense a temperature value of fluid in the primary diesel exhaust fluid storage tank, in accordance with particular embodiments. The temperature sensor is communicably coupled to the at least one controller. The at least one controller is configured to activate the transfer pump based, at least in part on the sensed temperature value. The primary diesel exhaust fluid system may include a pressure sensor configured to sense a pressure value of fluid in the primary diesel exhaust fluid storage tank. The pressure sensor is communicably coupled to the at least one controller. The at least one controller is configured to activate the transfer pump based, at least in part, on the sensed pressure value. In particular embodiments, the auxiliary diesel exhaust fluid storage tank includes a vent configured to vent the auxiliary diesel exhaust fluid storage tank to ambient air.

The vent may include a filter configured to inhibit contaminants from the ambient air from entering the diesel exhaust fluid in the auxiliary diesel exhaust fluid storage tank, in accordance with particular embodiments. The at least one fluid conduit may also include a filter configured to inhibit contaminants in the diesel exhaust fluid from flowing through the at least one fluid conduit, in accordance with particular embodiments to the primary tank. The auxiliary diesel exhaust fluid storage tank and/or the at least one fluid conduit may further include a heating system to heat the diesel exhaust fluid when the ambient temperature is cold. In one embodiment this heating system is a heat exchanger configured to heat diesel exhaust fluid utilizing heated coolant from the diesel engine. In yet another embodiment, the heating system is electrically powered. In yet another embodiment, the primary diesel exhaust fluid system may include a heater configured to heat the diesel exhaust fluid in the primary diesel exhaust fluid storage tank. The transfer pump and at least one fluid conduit are then utilized to circulate the heated diesel exhaust fluid between the primary diesel exhaust fluid system and auxiliary diesel exhaust fluid storage tank. In particular embodiments, the at least one controller is configured to control the flow rate of diesel exhaust fluid from the auxiliary diesel exhaust fluid storage tank to the primary diesel exhaust fluid storage tank by the transfer pump.

Another set of embodiments provide a method of operating a generator assembly. The method includes starting a diesel engine including an aftertreatment exhaust system coupled to an exhaust manifold of the diesel engine. The diesel engine is housed, at least in part, in a generator enclosure. The method includes pumping exhaust fluid from a primary diesel exhaust fluid storage tank fluidly coupled to the aftertreatment exhaust system. The primary diesel exhaust fluid storage tank is housed, at least in part, in the generator enclosure. The method includes sensing at least one parameter related to diesel exhaust fluid in the primary diesel exhaust fluid storage tank. The method includes causing actuation of a transfer pump fluidly coupled to an auxiliary diesel exhaust fluid storage tank in response to sensing the at least one parameter. The actuation causes transfer of diesel exhaust fluid from the auxiliary diesel exhaust fluid storage tank to the primary diesel exhaust fluid storage tank via at least one fluid conduit fluidly coupling the transfer pump to the primary diesel exhaust fluid storage tank.

In particular embodiments, the method includes determining a quantity value of fluid in the primary diesel exhaust fluid storage tank. Actuating the transfer pump is based, at least in part, on the quantity value. The method also includes actuating the transfer pump if the quantity value is below a predetermined threshold. The method may further include determining, based on the at least one parameter sensed, a temperature value of diesel exhaust fluid in the primary diesel exhaust fluid storage tank, in accordance with particular embodiments. Actuating the transfer pump is based, at least in part, on the determined temperature value. In particular embodiments, the method includes determining, based on the at least one parameter sensed, a pressure value of diesel exhaust fluid in the primary diesel exhaust fluid storage tank. Actuating the transfer pump is based, at least in part, on the determined pressure value. The method may include determining, based on the at least one parameter sensed, a quality value of diesel exhaust fluid in the primary diesel exhaust fluid storage tank. Actuating the transfer pump is based, at least in part, on the determined quality value.

In still a further set of embodiments, a method of operating a generator assembly is provided. The method includes fluidly coupling a primary diesel exhaust fluid storage tank to a transfer pump fluidly coupled to a secondary diesel exhaust fluid storage tank. The primary diesel exhaust fluid storage tank is housed, at least in part, in a generator enclosure. The generator enclosure houses, at least in part, a diesel engine and an aftertreatment exhaust system coupled to an exhaust manifold of the diesel engine. The aftertreatment exhaust system is fluidly coupled to the primary diesel exhaust fluid storage tank. The secondary diesel exhaust fluid storage tank is housed, at least in part, in an auxiliary enclosure positioned outside of the generator enclosure. The method includes electrically causing actuation of the transfer pump in response to sensing at least one parameter of diesel exhaust fluid. Actuating the transfer pump causes transfer of the diesel exhaust fluid from the auxiliary diesel exhaust fluid storage tank to the primary diesel exhaust fluid storage tank.

In particular embodiments, actuating includes actuating the transfer pump in response to sensing a quantity of the diesel exhaust fluid in the primary diesel exhaust fluid storage tank. Actuating may include actuating the transfer pump in response to sensing a temperature of the diesel exhaust fluid in the primary diesel exhaust fluid storage tank. Actuating may include actuating the transfer pump in response to sensing a pressure of the diesel exhaust fluid in the primary diesel exhaust fluid storage tank. Actuating may include actuating the transfer pump in response to sensing a quality of the diesel exhaust fluid in the primary diesel exhaust fluid storage tank. In particular embodiments, the method includes heating the fluid in one or more of the hose, the primary diesel exhaust fluid storage tank, or the secondary diesel exhaust fluid storage tank, or circulating heated diesel exhaust fluid between the primary diesel exhaust fluid storage tank and the secondary diesel exhaust fluid storage tank. It is noted that the transfer pump can be located in the primary or secondary diesel exhaust fluid storage tanks or in the transfer hose. It is further noted that the transfer of diesel exhaust fluid can also occur passively by gravity feed under control of a control valve, float valve, or float switch.

Yet a further set of embodiments provide a generator assembly control system including a sensing module and an actuation module. The sensing module is electrically coupled to at least one sensor associated with a primary diesel exhaust fluid storage tank contained in a generator enclosure. The at least one sensing module is configured to receive at least one parameter from the at least one sensor. The at least one parameter is related to diesel exhaust fluid in the primary diesel exhaust fluid storage tank. The actuation module is configured to cause actuation of a transfer pump in response to the received parameter so as to cause transfer of diesel exhaust fluid from an auxiliary diesel exhaust fluid storage tank outside of the generator enclosure to a primary diesel exhaust fluid storage tank fluidly coupled to the auxiliary diesel exhaust fluid storage tank. In example embodiments, the transfer pump may be positioned in the primary diesel exhaust fluid storage tank or the auxiliary diesel exhaust fluid storage tank, or a float valve or flow control valve opened with a gravity fed fluid flow.

In particular embodiments, the generator assembly control system includes a heater control module configured to cause a heating element or heat exchanger in the at least one fluid conduit to heat up the diesel exhaust fluid flowing through the at least one fluid conduit.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The skilled artisan will understand that the drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The features and advantages of the inventive concepts disclosed herein will become more apparent from the detailed description set forth below when taken in conjunction with the drawings.

DETAILED DESCRIPTION

Following below are more detailed descriptions of various concepts related to, and embodiments of, inventive generator assembly systems and methods of operating generator assembly systems. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

In accordance with example embodiments disclosed herein, an auxiliary DEF interface facilitates the use of an auxiliary, external, or secondary DEF tank through the implementation of control logic configured to maintain the proper level of diesel exhaust fluid in the on-board or primary via the auxiliary tank and thereby allow a diesel engine to continuously receive DEF from the on-board tank. As discussed further herein, the auxiliary DEF interface facilitates controlling and powering an external pump and heating a DEF supply line. In accordance with example embodiments, the control logic is further configured to take into account maintaining proper fill rates, venting and safety shut off in the on-board DEF tank.

Figure 1:
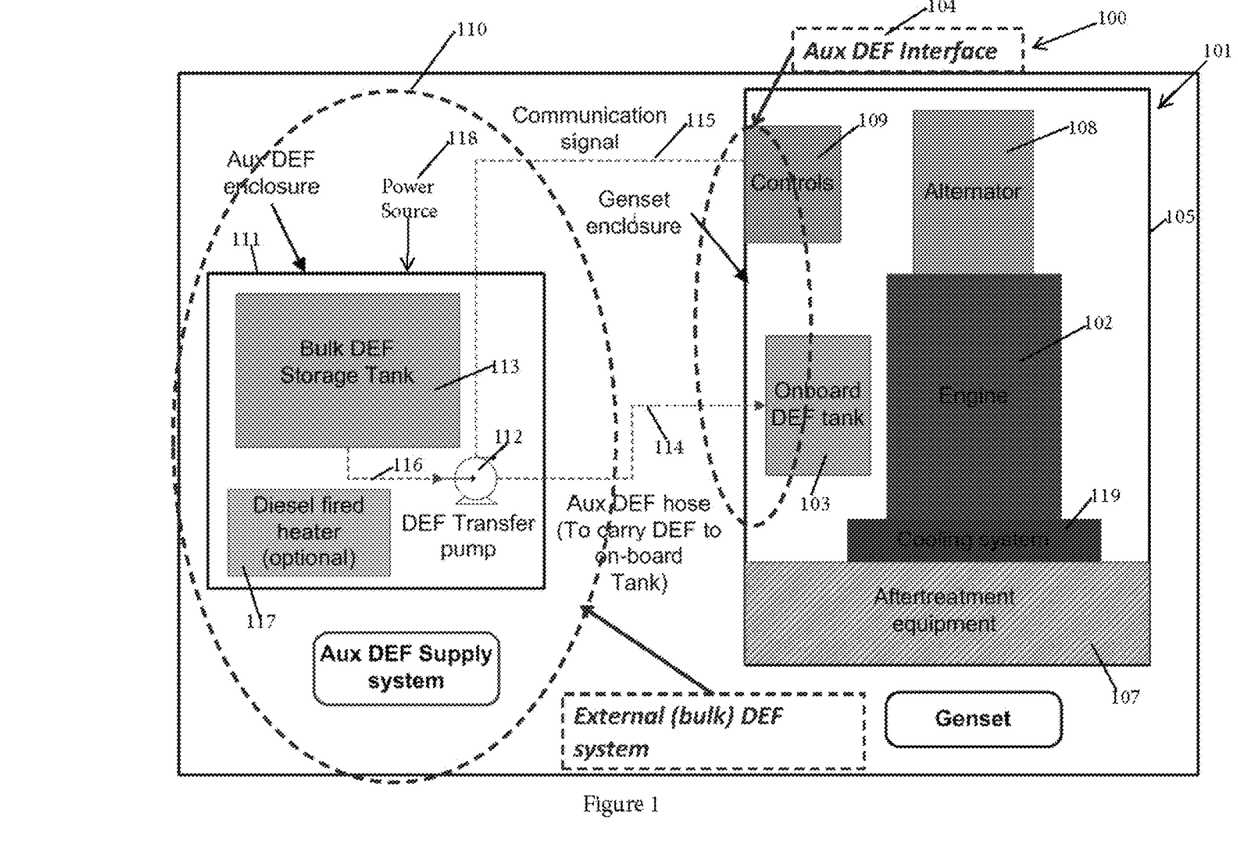
FIG. 1 is a schematic diagram of a generator assembly system, in accordance with example embodiments.

FIG. 1 is a schematic diagram of a generator assembly system, in accordance with example embodiments. A generator assembly system 100 includes a generator system 101 and an auxiliary DEF system 110. The generator assembly system 100 includes, but is not limited to, a stationary diesel engine system useable for pumping, compression, heating, ventilation and cooling, construction equipment, forestry equipment, mining equipment, combined heat and power applications, and other power generation systems and applications The generator system 101 includes a generator enclosure 105. The generator enclosure 105 houses a diesel engine 102. The diesel engine 102 includes an exhaust aftertreatment system 107. The exhaust aftertreatment system 107 is coupled to the diesel engine 102, for example via an exhaust conduit or an exhaust manifold coupled to an exhaust port of the diesel engine 102. The exhaust aftertreatment system 107 receives DEF used to process and reduce the contaminants or other undesirable constituents in the exhaust flow from the diesel engine 102. During operation, diesel engine 102 expels exhaust gas through an exhaust passage including the exhaust gas aftertreatment system 107. Generally, the exhaust gas aftertreatment system 107 is configured to remove various chemical and particulate emissions present in the exhaust gas.

The exhaust aftertreatment system 107 may include an SCR or other catalyst utilizing a reductant. The SCR catalyst is configured to reduce $NO_x$ into less harmful emissions, such as $N_2$ and $H_2O$, in the presence of ammonia. Because ammonia is not a natural byproduct of the combustion process, it must be artificially introduced into the exhaust gas prior to the exhaust gas entering the SCR catalyst. Typically, ammonia is not directly injected into the exhaust gas due to safety considerations associated with storage of liquid ammonia. Accordingly, the exhaust aftertreatment system 107 includes a doser that is configured to inject DEF (typically a urea-water solution) into the exhaust gas, where it decomposes into ammonia. The doser may be configured to inject DEF into a decomposition tube, which facilitates the decomposition of DEF into ammonia.

Generally, the urea present in DEF decomposes into gaseous ammonia in three stages. First, the urea evaporates or mixes with exhaust gas. Second, the temperature of the exhaust gas causes a phase change in the urea and decomposition of the urea into isocyanic acid (HNCO) and water. Third, the isocyanic acid reacts with water in a hydrolysis process under specific pressure and temperature concentrations to decompose into ammonia and carbon dioxide ($CO_2$). The ammonia is then introduced at the inlet face of the SCR catalyst, flows through the catalyst, and is consumed in the $NO_x$ reduction process. Any unconsumed ammonia exiting the SCR catalyst (e.g., "ammonia slip") can be reduced to $N_2$ and other less harmful or less noxious components using an ammonia oxidation catalyst.

The diesel engine 102 also includes an alternator 108 and a cooling system 119. The diesel engine 102 is fluidly coupled to a diesel fuel supply which may include one or more on-board diesel fuel tanks and/or an auxiliary fuel tank, such as a 1000 gallon diesel fuel tank stored separately from the generator system 101. The exhaust aftertreatment system 107 of the diesel engine 102 is coupled to an on-board DEF storage tank 103 providing DEF to the exhaust aftertreatment system 107 for treatment of the exhaust from the diesel engine 102 via an aftertreatment fluid connector 104. The generator system 101 includes a generator controller 109 configured to control operation of the components of the generator assembly system. The generator controller 109 is coupled to one or more sensors including, but not limited to, a level sensor configured to determine a quantity of fuel in the on-board DEF storage tank 103, a temperature sensor, a quality sensor, and a pressure sensor. For example, the generator controller 109 is activated in response to a low level of fuel sensed in the on-board DEF storage tank 103 to pump fuel from an auxiliary DEF storage tank 113 to the on-board DEF storage tank 103. The generator controller 109 may consider other parameters such as temperature as an alternative or in addition to a low level detection and may circulate DEF between the auxiliary DEF storage tank 113 and the on-board DEF storage tank 103 to reach a desired temperature value. The generator controller 109 may take a quality poll from the quality sensor in connection with pumping DEF between the auxiliary DEF storage tank 113 and the on-board DEF storage tank 103. The quality sensor may be configured to assess the quality of the DEF in either the on-board DEF storage tank 103 or an auxiliary DEF storage tank 113 as described further herein. If the quality is not appropriate, the controller 109 may decide not to pump DEF from the auxiliary DEF storage tank 113 (such as if a user has filled the auxiliary DEF storage tank 113 with water, or if the DEF is too dilute or becomes contaminated). Alternatively, if DEF quality is higher in the auxiliary DEF storage tank 113, the controller 109 may be configured to draw immediately from the auxiliary DEF storage tank 113 regardless of the level of DEF in the on-board DEF storage tank 103 to improve quality in the on-board DEF storage tank 103 or signal an operator to purge the on-board DEF storage tank 103 and refill from the auxiliary DEF storage tank 113. If DEF quality in the on-board DEF storage tank 103 falls or begins to deteriorate upon activating a transfer pump 112 to pump DEF from the auxiliary DEF storage tank 113 to the on-board DEF storage tank 103, the controller 109 can decide to terminate the pumping operation to prevent the remaining DEF in the on-board DEF storage tank 103 from becoming diluted or unusable and flag the operator.

The generator assembly system 100 also includes an auxiliary DEF system 110, including an auxiliary enclosure 111 housing the auxiliary DEF storage tank 113 and the transfer pump 112. The transfer pump 112 is fluidly coupled to the auxiliary DEF storage tank 113, via transfer pump line 116, and is fluidly coupled to the on-board DEF storage tank 103, via an auxiliary DEF hose 114 and auxiliary DEF interface 104. The transfer pump 112 is communicably coupled to the generator controller 109 via electrical control line 115 (which may also supply power to the transfer pump 112) and the auxiliary DEF interface 104, whereby the generator controller 109 sends control signals to the transfer pump 112. The generator controller 109 is configured to cause actuation of the transfer pump 112 of the auxiliary DEF system 110 so as to cause transfer of DEF from the auxiliary DEF storage tank 113 to the on-board DEF storage tank 103.

The auxiliary DEF hose 114 fluidly couples the transfer pump 112 to the on-board DEF storage tank 103 to facilitate the transfer. The auxiliary DEF hose 114 may include a heating element or heating systems. In particular embodiments, the generator controller 109 is configured to actuate and deactivate the transfer pump 112 based, at least in part, on the fluid level in the on-board DEF storage tank 103. For example the transfer may be initiated in response to the fluid level in the on-board DEF storage tank 103 falling below a predetermined level and may be terminated in response to the fluid level in the on-board DEF storage tank 103 reaching a pre-determined level. In example embodiments, the generator controller 109 may be configured for time based control, for example to terminate actuation of the transfer pump 112 after a certain period of time has expired. The time-based control may be configured as a back-up control system, for example if the quantity based sensor fails. Another fail safe feature allows a pre-set timer to fill DEF only a set number of times. If a level is not reached and the DEF transfer pump 112 makes too many timer-based attempts to fill the on-board DEF storage tank 103, the generator controller 109 may send out a fault code alerting an end user of a potential problem and shuts off the DEF transfer pump 112 thereby preventing it from making endless attempts to refill. Levels may also be compared between the on-board DEF storage tank 103 and the auxiliary DEF storage tank 113 during transfer to ensure proper fill operation and detect errors/spills. The level based logic, coupled with timer logic and counter logic, ensure no DEF overfill and/or spill occurs. In particular embodiments, the transfer request based on the low fluid level may be postponed. For example, postponement may occur if the temperature of the fluid in the on-board DEF storage tank 103 is below a certain temperature (and trigger the heater operation) or if, for example, the fluid pressure in the on-board DEF storage tank is above a certain pressure. The generator controller 109 may be configured to control the flow-rate and/or speed of the transfer pump 112.

The auxiliary DEF system 110 also includes a heater 117 configured to heat the DEF stored in the auxiliary DEF storage tank 113. In example embodiments, the auxiliary DEF system 110 may receive power from an alternative source, such as by shore power 118 or another diesel generator, in accordance with example embodiments. The auxiliary DEF system 110 may also be powered by other means (solar, fuel cell, biomass driven generator, battery and so forth).

In example embodiments, the auxiliary DEF storage tank 113 may be configured as a gravity feed tank positioned above the on-board DEF storage tank 103 and filling the on-board DEF storage tank 103 via a level operated float valve. In alternate embodiments, the level operated float valve may be used with a simple pump where an interface provides constant power to a pump that runs all the time or cycles on and off periodically via the generator controller 109 and DEF is filled/topped up in the on-board DEF storage tank 103 via the float valve. In embodiments used with a float switch or ultrasonic level sensor or other level sensing device, the float switch/level sensor may be configured to trigger the pump when the on-board DEF storage tank 103 falls below a threshold level and then stops either after a timed period or upon reaching a full state or upper threshold.

Figure 2:
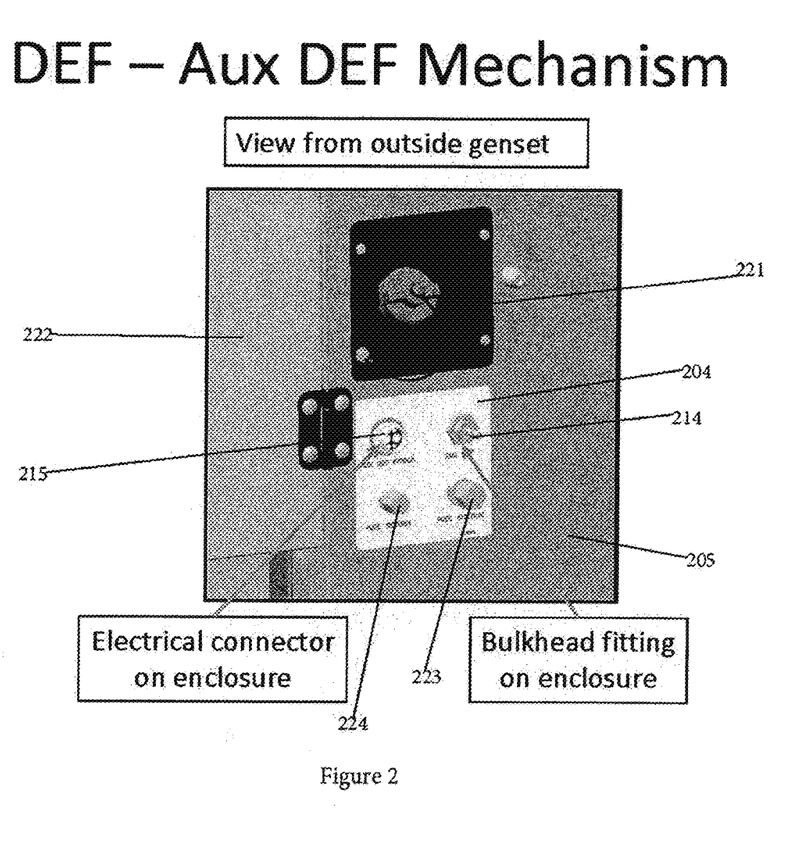
FIG. 2 is a partial view of a connection interface on a generator enclosure of a generator assembly system, in accordance with example embodiments.

FIG. 2 is a partial view of a connection interface on a generator enclosure of a generator assembly system, in accordance with example embodiments. A generator system and an auxiliary DEF system are connected by an auxiliary DEF interface 204 positioned in the generator enclosure 205, as discussed in further detail below. As shown in FIG. 2, the auxiliary DEF interface 204 incorporates mechanical hardware (fittings/hose), electrical hardware (harness/connectors) and software (controls logic) to enable proper operation of the generator system under varying conditions and more specifically beyond the capacity of an on-board DEF storage tank for example when the generator system is coupled to an auxiliary diesel fluid storage tank. The auxiliary DEF interface 204 includes an electrical connection 215 that provides an actuation signal to the DEF transfer pump. The electrical connection 215 may also be used to power the DEF transfer pump using the generator assembly battery. The electrical connection 215 may also control heating for the auxiliary DEF hose or auxiliary DEF tank, which may be powered by a power supply, such as shore power or another generator, a battery, a fuel cell, a solar cell or other power source.

The auxiliary DEF interface 204 includes a bulkhead fitting 214 that may be composed of, but is not limited to, stainless steel, such as 304 stainless steel or higher grade stainless, or any other material compatible with DEF. The bulkhead fitting 214 may include a cap and may also be composed of stainless steel. The auxiliary DEF interface 204 includes an auxiliary fuel interface that includes a diesel fuel in port 223 and a diesel fuel out port 224. The diesel fuel in port 223 is configured to supply diesel fuel from an auxiliary diesel storage tank to the diesel engine contained in the generator enclosure 205. By having the auxiliary DEF interface 204 and the diesel fuel auxiliary interface both adjacent to each other, customers have the option of connecting external fill systems for both fluids. The generator enclosure 205 also includes an enclosure door 222 providing access to the diesel engine and other generator components of the generator assembly 201 housed in the generator enclosure 205. The generator enclosure 205 also includes a manual fill DEF port 221.

Figure 3:
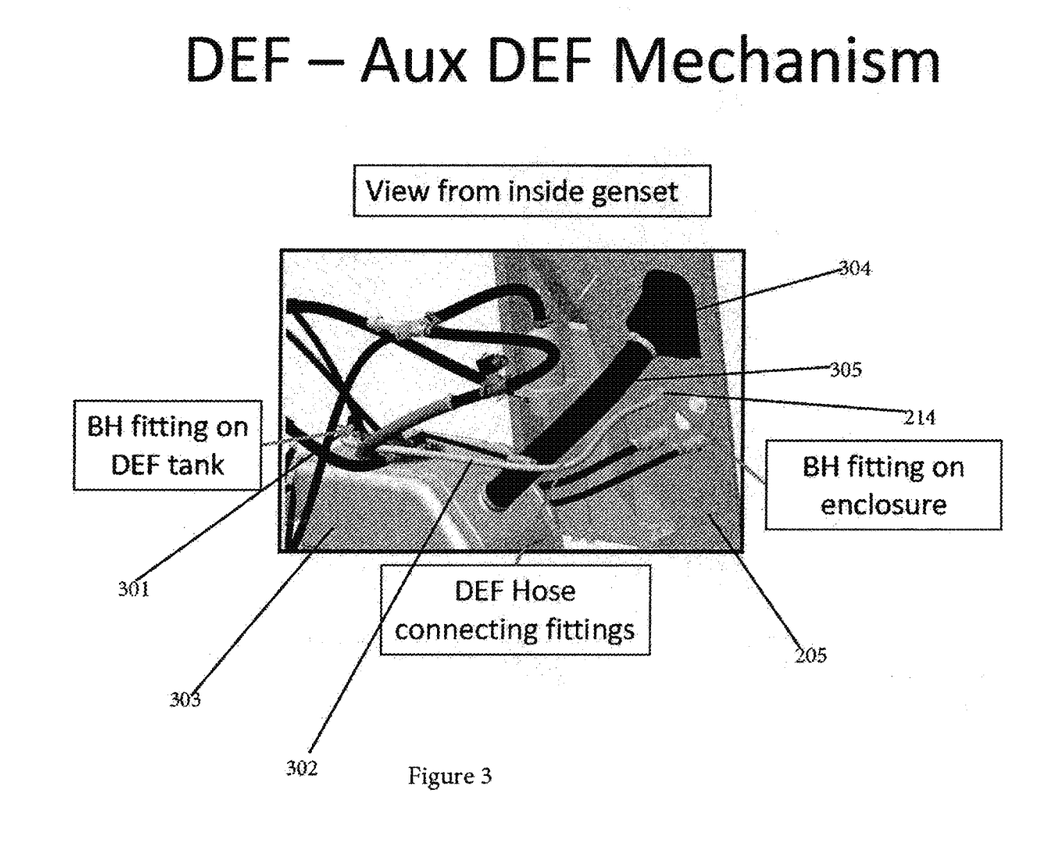
FIG. 3 is a partial view inside a generator enclosure showing interfaces with a primary diesel exhaust fluid storage tank, in accordance with example embodiments.

FIG. 3 is a partial view inside a generator enclosure showing interfaces with an on-board DEF storage tank, in accordance with example embodiments. FIG. 3 is a view inside the generator enclosure 205 of FIG. 2. As shown in FIG. 3, an on-board DEF storage tank 303 is fluidly coupled to the auxiliary DEF interface 204. More specifically, the on-board DEF storage tank 303 includes a bulk head fitting 301 coupled to a DEF hose 302 coupled to the bulkhead fitting 214 on the auxiliary DEF interface 204. The on-board DEF storage tank 303 is also coupled to the manual fill DEF port 221 via a manual fill DEF hose 305.

Figure 4:
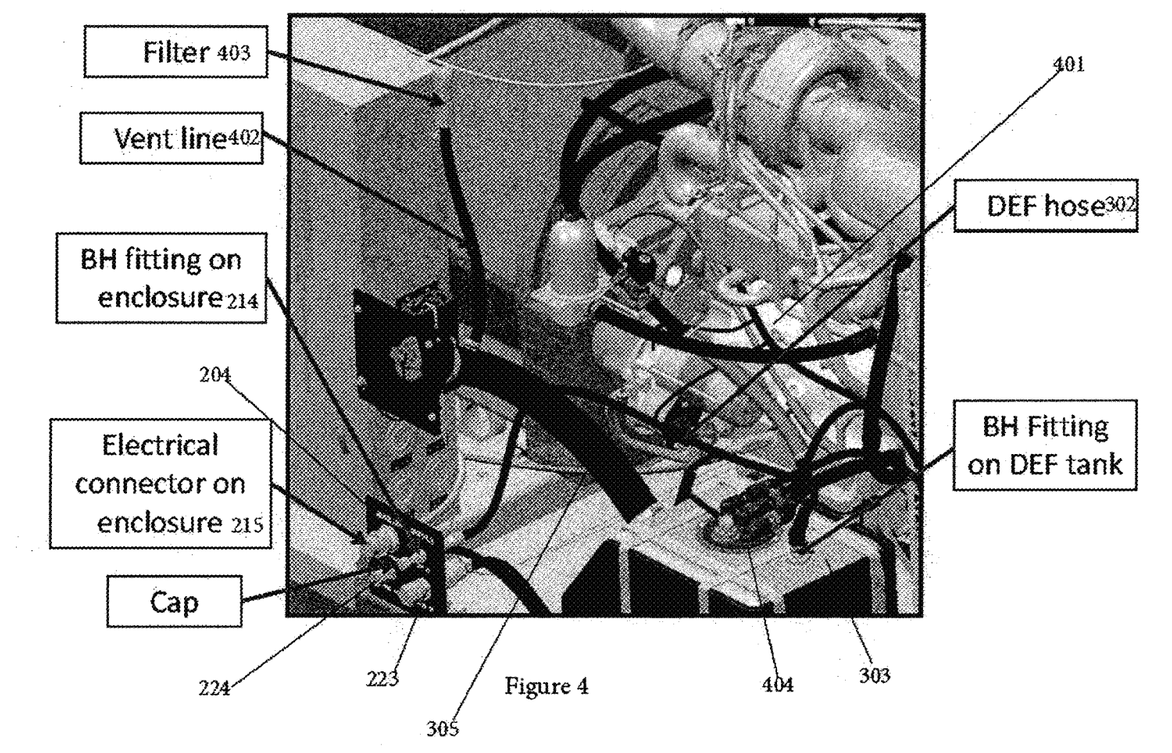
FIG. 4 is a partial cutaway view through a generator enclosure, in accordance with example embodiments.

FIG. 4 is a partial cutaway view through a generator enclosure, in accordance with example embodiments. The partial cutaway view of FIG. 4 demonstrates inside the generator enclosure 205. As shown in FIG. 4, a diesel engine 401 is housed in the generator enclosure 205. The on-board DEF storage tank 303 is fluidly coupled to an exhaust aftertreatment system of the diesel engine 401. The manual fill DEF hose 305 of the on-board DEF storage tank 303 includes a vent line 402, including a filter 403 coupled thereto. The fluid filling system permits adequate venting via the vent line 402. The vent line 402 provides a path for the air to escape while the on-board DEF storage tank 303 is being filled. It also ensures air flow into the on-board DEF storage tank 303 while DEF is being consumed to maintain proper pressures in the on-board DEF storage tank 303. The vent line 402 is composed of DEF compatible material. The filter 403 at the end of the vent line 402 helps prevent dirt from entering the on-board DEF storage tank 303. In one embodiment, the vent line 402 may also be automatically opened and closed under operation of the generator controller 109. In other embodiments, the vent line 402 may also be closed for shipment and storage, and then opened on site by an operator when coupled to the generator system 101 for use.

In example embodiments, a vent and/or filter are positioned in the auxiliary DEF hose coupling the bulkhead fitting 214 to a transfer pump and an auxiliary DEF storage tank. The on-board DEF storage tank 303 includes a sensor base 404 housing one or more sensors, such as a temperature, fluid level, pressure, and/or quality sensor, configured to sensor various properties of fluid in the on-board DEF storage tank 303. The sensed parameters are used to control actuation of a DEF transfer pump fluidly coupling an auxiliary DEF storage tank to the on-board DEF storage tank 303 via one or more fluid conduits or hoses fluidly coupling the separate tanks.

Figure 5A:
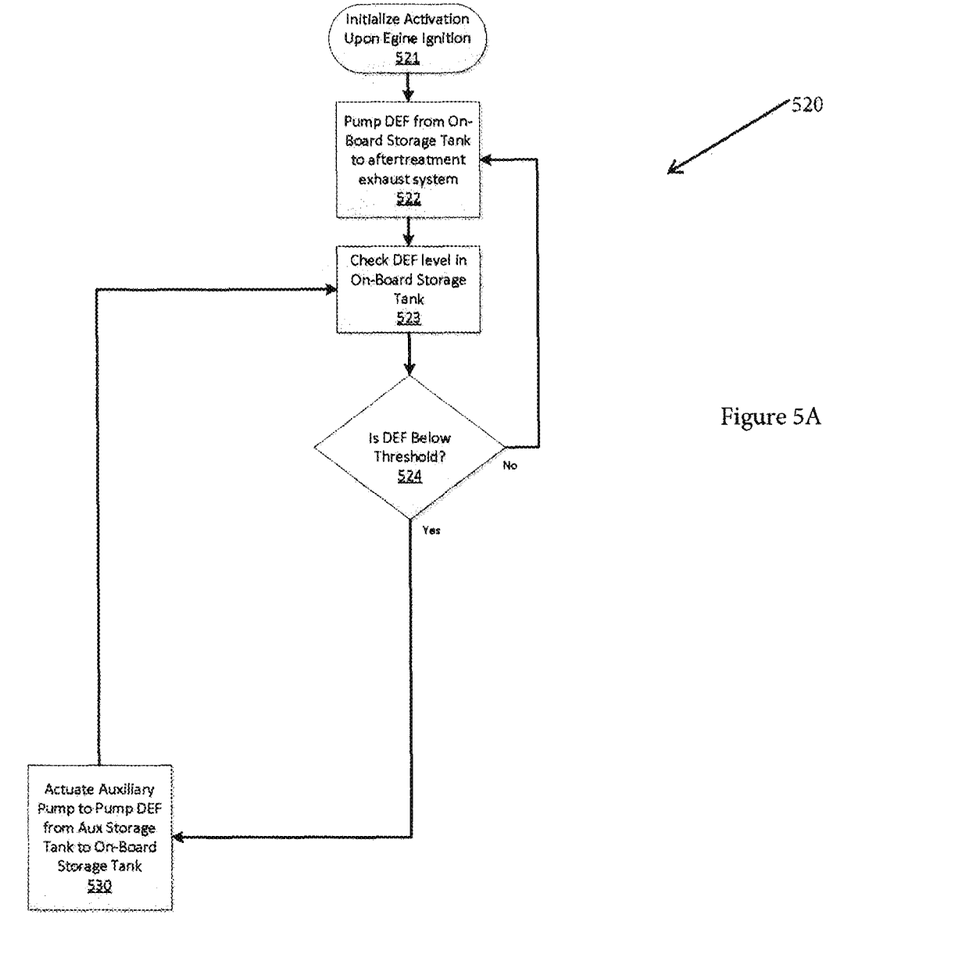
FIGS. 5A and 5B are flow diagrams showing methods of operating an operating a generator assembly system, in accordance with example embodiments.
Figure 5B:
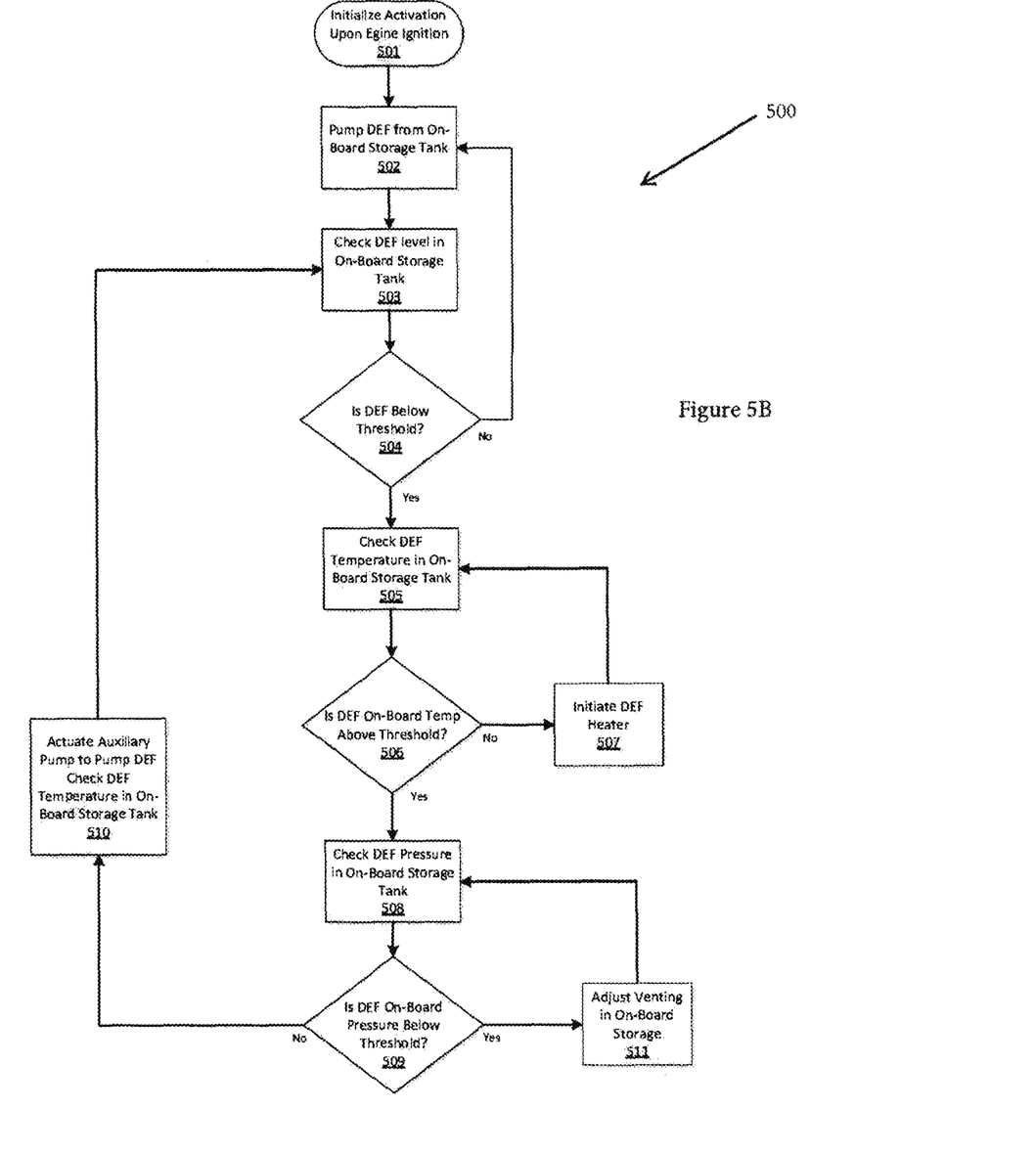

FIGS. 5A and 5B are flow diagrams showing methods of operating an operating a generator assembly system, in accordance with example embodiments.

A control system 520 may be controlled by one or more generator assembly controllers in accordance with example embodiments to control the actuation of the transfer pump and the re-filling of the on-board DEF storage tank from the auxiliary DEF storage tank. At 521, the diesel engine in a generator enclosure is started, for example for power generation purposes. The diesel engine includes an exhaust aftertreatment system. The exhaust aftertreatment system uses fluid from an on-board DEF storage tank to treat the exhaust flowing through the exhaust aftertreatment system. The diesel engine may be coupled to an auxiliary diesel fuel supply and the capacity of the on-board DEF storage tank may be insufficient to maintain the engine running through the consumption of the diesel fuel by the diesel engine from the auxiliary diesel fuel supply.

At 522, the generator assembly controller causes DEF to be pumped from the on-board DEF storage tank to the exhaust aftertreatment system. At 523, the generator assembly controller checks the DEF level in the on-board DEF storage tank. At 524, the controller determines if the DEF level in the on-board DEF storage tank is below a predetermined level. If the DEF level is not below a predetermined level, the controller will continue to cause or allow DEF to be pumped from the on-board DEF storage tank without refilling the tank. If the DEF quantity is below a certain level, at 530 the controller will cause DEF fluid from an auxiliary tank to be pumped to the on-board storage tank, so that DEF fluid can continue being pumped from the on-board DEF storage tank to the exhaust aftertreatment system.

FIG. 5B shows another embodiment of a control system configured to cause DEF flow from an auxiliary storage tank to an on-board storage tank in response to certain conditions. A control system 500 may be controlled by one or more generator assembly controllers in accordance with example embodiments to control the actuation of the transfer pump and the re-filling of the on-board DEF storage tank from the auxiliary DEF storage tank, in response to varying DEF conditions in the on-board DEF storage tank. Such varying conditions include, but are not limited to, quantity, temperature, pressure, and/or quality, which parameters may be determined either or both the on-board DEF storage tank and the auxiliary storage tank. At 501, the diesel engine in a generator enclosure is started, for example for power generation purposes. The diesel engine includes an exhaust aftertreatment system. The exhaust aftertreatment system uses fluid from an on-board DEF storage tank to treat the exhaust flowing through the exhaust aftertreatment system. The diesel engine may be coupled to an auxiliary diesel fuel supply and the capacity of the on-board DEF storage tank may be insufficient to maintain the engine running through the consumption of the diesel fuel by the diesel engine from the auxiliary diesel fuel supply.

At 502, the generator assembly controller causes DEF to be pumped from the on-board DEF storage tank to the exhaust aftertreatment system. At 503, the generator assembly controller checks the DEF level in the on-board DEF storage tank. At 504, the controller determines if the DEF level in the on-board DEF storage tank is below a predetermined level. If the DEF level is not below a predetermined level, the controller will continue to cause or allow DEF to be pumped from the on-board DEF storage tank without refilling the tank. If the quantity is below a certain level, the controller will cause DEF fluid from an auxiliary tank to be pumped to the on-board storage tank, conditions permitting, so that DEF fluid can continue being pumped from the on-board DEF storage tank to the exhaust aftertreatment system. Specifically, at 505 the controller can be configured to check the on-board temperature before actuating a transfer pump to pump DEF from the auxiliary DEF storage tank to the on-board DEFT storage tank. If the temperature is below a certain level, at 507 the controller initiates DEF fluid heating, for example in the on-board storage or via the auxiliary DEF to increase the temperature. If the temperature is at or above a certain level, the controller checks the fluid pressure at 508. If, at analysis 509, the pressure is determined to be appropriate, at 510 the controller causes the transfer pump to actuate pumping from the auxiliary DEF storage tank to the on-board DEF storage tank so that the diesel engine can seamlessly continue to run and draw DEF directly from the on-board storage tank. If the pressure is above a certain level, the controller causes a pressure change at 500, for example via changing the venting conditions. The exhaust aftertreatment system is configured to always receive DEF from the on-board DEF storage tank; however, the control system 500 controls re-filling of the on-board DEF storage tank so that the draw from the on-board DEF storage tank can continue beyond the initial capacity of the on-board storage tank thereby permitting the diesel engine to continue running based on the fuel supply available from an auxiliary fuel tank not contained in the generator enclosure.

In certain embodiments, the control system 500 further includes a controller structured to perform certain operations to actuate the transfer pump and causing DEF to be pumped from the auxiliary DEF storage tank to the on-board auxiliary DEF storage tank. In certain embodiments, the controller forms a portion of a processing subsystem including one or more computing devices having memory, processing, and communication hardware. The controller may be a single device or a distributed device, and the functions of the controller may be performed by hardware and/or as computer instructions on a non-transient computer readable storage medium.

In certain embodiments, the controller includes one or more modules structured to functionally execute the operations of the controller. In certain embodiments, the controller includes sensor modules configured to determine a fluid level value, a temperature value, a pressure value, and/or a quality value of DEF.

The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or as computer instructions on a non-transient computer readable storage medium, and modules may be distributed across various hardware or computer based components. More specific descriptions of certain embodiments of controller operations are included in the section referencing FIG. 5.

Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary embodiments, and that such variations are intended to be encompassed by the present disclosure. It is recognized that features of the disclosed embodiments can be incorporated into other disclosed embodiments.

It is important to note that the constructions and arrangements of apparatuses or the components thereof as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

While various inventive embodiments have been described and illustrated herein, those of ordinary skill in the art will readily envision a variety of other mechanisms and/or structures for performing the function and/or obtaining the results and/or one or more of the advantages described herein, and each of such variations and/or modifications is deemed to be within the scope of the inventive embodiments described herein. More generally, those skilled in the art will readily appreciate that, unless otherwise noted, any parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way unless otherwise specifically noted. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one."

In the claims, as well as in the specification above, all transitional phrases such as "comprising," "including," "having," "involving," and the like are to be understood to be open-ended, i.e., to mean including but not limited to.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

The invention claimed is:

1. A generator assembly system, comprising: a
a generator enclosure;

a diesel engine housed, at least in part, in the generator enclosure;

an aftertreatment exhaust system including a selective catalytic reduction (SCR) catalyst and coupled to an exhaust manifold of the diesel engine, the aftertreatment exhaust system housed, at least in part, in the generator enclosure;

a primary diesel exhaust fluid system including a primary diesel exhaust fluid storage tank holding a urea-water solution and fluidly coupled to the aftertreatment exhaust system, the primary diesel exhaust fluid system housed, at least in part, in the generator enclosure;

an auxiliary diesel exhaust fluid system including an auxiliary diesel exhaust fluid storage tank holding the urea-water solution, the auxiliary diesel exhaust fluid system housed in an auxiliary enclosure positioned outside of the generator enclosure; and at least one controller communicably coupled to the primary diesel exhaust fluid system, the at least one controller configured to cause transfer of diesel exhaust fluid including the urea-water solution from the auxiliary diesel exhaust fluid storage tank to the primary diesel exhaust fluid storage tank.

2. The generator assembly system of claim 1, further comprising:

a transfer pump fluidly coupled to the auxiliary diesel exhaust fluid storage tank; and at least one fluid conduit fluidly coupling the transfer pump to the primary diesel exhaust fluid storage tank, wherein the at least one controller is further communicably connected to the transfer pump, and wherein the at least one controller is configured to activate the transfer pump, thereby causing the transfer of diesel exhaust fluid from the auxiliary diesel exhaust fluid storage tank to the primary diesel exhaust fluid storage tank.

3. The generator assembly system of claim 2, wherein the primary diesel exhaust fluid system includes a level sensor configured to sense a quantity of fluid in the primary diesel exhaust fluid storage tank, the level sensor communicably coupled to the at least one controller, and wherein the at least one controller is configured to activate the transfer pump based, at least in part, on the sensed quantity of fluid.

4. The generator assembly system of claim 2, wherein the primary diesel exhaust fluid system includes a temperature sensor configured to sense a temperature value of fluid in the primary diesel exhaust fluid storage tank, the temperature sensor communicably coupled to the at least one controller, wherein the at least one controller is configured to activate the transfer pump based, at least in part on the sensed temperature value.

5. The generator assembly system of claim 2, wherein the at least one fluid conduit includes a vent configured to vent the auxiliary diesel exhaust fluid storage tank to ambient air.

6. The generator assembly system of claim 5, wherein the vent includes a filter configured to inhibit contaminants from the ambient air from entering the diesel exhaust fluid in the auxiliary diesel exhaust fluid storage tank.

7. The generator assembly system of claim 2, wherein the at least one fluid conduit includes a filter configured to inhibit contaminants in the diesel exhaust fluid from flowing through the at least one fluid conduit to the primary tank.

8. The generator assembly system of claim 2, further comprising a heating system, the heating system configured to heat diesel exhaust fluid.

9. The generator assembly system of claim 2, wherein the heating system includes a heat exchanger configured to heat diesel exhaust fluid utilizing heated coolant from the diesel engine.

10. The generator assembly system of claim 2, wherein the heating system is electrically powered.

11. The generator assembly system of claim 2, wherein the primary diesel exhaust fluid system includes a heater, the heater configured to heat the diesel exhaust fluid in the primary diesel exhaust fluid storage tank, the transfer pump configured to circulate the heated diesel exhaust fluid between the primary diesel exhaust fluid system and the auxiliary diesel exhaust fluid storage tank.

12. The generator assembly system of claim 2, wherein the at least one controller is configured to control the flow rate of diesel exhaust fluid from the auxiliary diesel exhaust fluid storage tank to the primary diesel exhaust fluid storage tank by the transfer pump.

13. A method of operating a generator assembly, the method comprising:

starting a diesel engine including an aftertreatment exhaust system including a selective catalytic reduction (SCR) catalyst and coupled to an exhaust manifold of the diesel engine, the diesel engine housed, at least in part, in a generator enclosure;

pumping a diesel exhaust fluid including a urea-water solution from a primary diesel exhaust fluid storage tank fluidly coupled to the aftertreatment exhaust system, the primary diesel exhaust fluid storage tank housed, at least in part, in the generator enclosure;

sensing at least one parameter related to the diesel exhaust fluid in the primary diesel exhaust fluid storage tank; and causing, via a controller, actuation of a transfer pump fluidly coupled to an auxiliary diesel exhaust fluid storage tank positioned outside the generator enclosure in response to sensing the at least one parameter so as to cause transfer of the diesel exhaust fluid including the urea-water solution from the auxiliary diesel exhaust fluid storage tank to the primary diesel exhaust fluid storage tank via at least one fluid conduit fluidly coupling the transfer pump to the primary diesel exhaust fluid storage tank.

14. The method of claim 13, further comprising:

determining a quantity value of fluid in the primary diesel exhaust fluid storage tank, wherein actuating the transfer pump is based, at least in part, on the quantity value; and actuating the transfer pump if the quantity value is below a predetermined threshold.

15. The method of claim 13, further comprising determining, based on the at least one parameter sensed, a temperature value of diesel exhaust fluid in the primary diesel exhaust fluid storage tank, wherein actuating the transfer pump is based, at least in part, on the determined temperature value.

16. The method of claim 13, further comprising determining, based on the at least one parameter sensed, a pressure value of diesel exhaust fluid in the primary diesel exhaust fluid storage tank, wherein actuating the transfer pump is based, at least in part, on the determined pressure value.

17. The method of claim 13, further comprising determining, based on the at least one parameter sensed, a quality value of diesel exhaust fluid in the primary diesel exhaust fluid storage tank, wherein actuating the transfer pump is based, at least in part, on the determined quality value.

18. A method of operating a generator assembly, the method comprising:
fluidly coupling a primary diesel exhaust fluid storage tank to a transfer pump fluidly coupled to a secondary diesel exhaust fluid storage tank, the primary diesel exhaust fluid storage tank housed, at least in part, in a generator enclosure, the generator enclosure housing, at least in part, a diesel engine and an aftertreatment exhaust system including a selective catalytic reduction (SCR) catalyst coupled to an exhaust manifold of the diesel engine, the aftertreatment exhaust system fluidly coupled to the primary diesel exhaust fluid storage tank, the secondary diesel exhaust fluid storage tank housed, at least in part, in an auxiliary enclosure positioned outside of the generator enclosure; and
electrically causing actuation, via a controller, of the transfer pump in response to sensing at least one parameter of diesel exhaust fluid including a urea-water solution so as to cause transfer of the diesel exhaust fluid from the secondary diesel exhaust fluid storage tank to the primary diesel exhaust fluid storage tank.

19. The method of claim 18, wherein actuating includes actuating the transfer pump in response to sensing a quantity of the diesel exhaust fluid in the primary diesel exhaust fluid storage tank.

20. The method of claim 18, wherein actuating includes actuating the transfer pump in response to sensing a temperature of the diesel exhaust fluid in the primary diesel exhaust fluid storage tank.

21. The method of claim 18, wherein actuating includes actuating the transfer pump in response to sensing a quality of the diesel exhaust fluid in the primary diesel exhaust fluid storage tank.

22. The method of claim 18, further comprising heating the diesel exhaust fluid transferred from the auxiliary diesel exhaust fluid storage tank to the primary diesel exhaust fluid storage tank.

* * * * *